United States Patent
Dais et al.

(10) Patent No.: US 8,455,763 B2
(45) Date of Patent: Jun. 4, 2013

(54) PLUG-IN BUSHING AND HIGH-VOLTAGE INSTALLATION HAVING A BUSHING SUCH AS THIS

(75) Inventors: Ansgar Dais, Dietikon (CH); Jens Rocks, Freienbach (CH); Oliver Ilic, Oberengstringen (CH)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/238,831

(22) Filed: Sep. 21, 2011

(65) Prior Publication Data

US 2012/0071014 A1    Mar. 22, 2012

(30) Foreign Application Priority Data

Sep. 21, 2010 (EP) ..................... 10177794

(51) Int. Cl.
*H01B 17/26* (2006.01)
(52) U.S. Cl.
USPC ..................... 174/152 R
(58) Field of Classification Search
USPC ............ 439/181; 174/152 R, 650, 652, 15.4, 174/142, 143
See application file for complete search history.

(56) References Cited

U.S. PATENT DOCUMENTS

| | | | | | |
|---|---|---|---|---|---|
| 4,370,514 | A | * | 1/1983 | Matthaus et al. | 174/31 R |
| 4,387,266 | A | * | 6/1983 | Matthaus | 174/31 R |
| 4,500,745 | A | * | 2/1985 | Miggins | 174/31 R |
| 6,452,109 | B1 | * | 9/2002 | Koch et al. | 174/152 R |
| 6,534,721 | B2 | * | 3/2003 | Hoefner | 174/158 R |
| 7,262,367 | B2 | * | 8/2007 | Donzel et al. | 174/142 |
| 7,742,676 | B2 | * | 6/2010 | Tilliette et al. | 385/138 |
| 7,825,331 | B2 | * | 11/2010 | Allais et al. | 174/15.4 |
| 7,964,799 | B2 | * | 6/2011 | Isberg et al. | 174/152 R |
| 8,003,891 | B2 | * | 8/2011 | Rocks et al. | 174/152 R |
| 8,227,698 | B2 | * | 7/2012 | Czyzewski et al. | 174/143 |
| 2007/0272432 | A1 | * | 11/2007 | Isberg et al. | 174/152 R |
| 2008/0179077 | A1 | * | 7/2008 | Krivda et al. | 174/152 R |
| 2009/0014211 | A1 | * | 1/2009 | Tilliette et al. | 174/650 |
| 2010/0206604 | A1 | | 8/2010 | Rocks et al. | |

FOREIGN PATENT DOCUMENTS

| | | |
|---|---|---|
| DE | 1189600 B | 3/1965 |
| DE | 102007022641 A1 | 11/2008 |
| EP | 2053616 A1 | 4/2009 |
| GB | 689560 | 4/1953 |
| WO | WO 2006/015735 A1 | 2/2006 |

OTHER PUBLICATIONS

European Search Report dated Mar. 23, 2011 for European Application No. 10177794.4.
* Thomas Klein et al., A New Separable 170 kV Outdoor Bushing System Creates a Multi-Purpose Transformer or Switchgear, 2006 PFISTERER Kontaktsysteme GmbH & Co. KG, 4 pages.

* cited by examiner

*Primary Examiner* — Alexander Gilman
(74) *Attorney, Agent, or Firm* — Buchanan Ingersoll & Rooney PC

(57) ABSTRACT

An exemplary plug-in high-voltage bushing connects an electrical conductor to a metal-encapsulated component, which is filled with insulating agent, of a high-voltage installation. The bushing is rotationally symmetrical with respect to an axis and has a centrally routed electrical conductor, a field control device and an insulator surrounds the electrical conductor. The bushing also includes a tapering section that dielectrically strengthens a joint after insertion of the bushing into a plug part, which forms a seal for the insulating agent. The joint is arranged between an insulating sleeve of the plug part and the tapering section of the insulator. The bushing has capacitor plates, which are electrically isolated from one another by an insulating film, are integrated into the insulator, and pass through the mounting flange into the tapering section of the insulator.

16 Claims, 2 Drawing Sheets

US 8,455,763 B2

PLUG-IN BUSHING AND HIGH-VOLTAGE INSTALLATION HAVING A BUSHING SUCH AS THIS

RELATED APPLICATION

This application claims priority under 35 U.S.C. §119 to European Patent Application No. 10177794.4 filed on Sep. 21, 2010, the entire content of which is hereby incorporated by reference in its entirety.

FIELD

The present disclosure relates to a high-voltage bushing, such as, a plug-in high-voltage bushing for connecting an external electrical conductor to a metal-encapsulated component, which is filled with a liquid or gaseous insulating agent, of a high-voltage installation.

BACKGROUND INFORMATION

Plug-in bushings of the type mentioned initially are described, for example, in GB 689 560, DE 10 2007 022 641 A1 and in an article by Klein et al. "A New Separable 170 kV Outdoor Bushing System Creates a Multi-Purpose Transformer or Switchgear", Kontaktsysteme GmbH & Co. KG (2006). The described plug bushings each have a plug part which can be inserted into a mating plug part, which is fitted to the transformer forming a seal for the insulating agent, while the transformer is being installed at the installation location. This considerably simplifies transport and maintenance of the transformer.

During insertion of the bushing, a joint is formed between an insulating sleeve of the mating plug part and the plug part, which is generally in the form of a plug, of the bushing, which joint is subject to the effect of a strong electrical field during operation of the transformer and of the bushing, and which can be dielectrically strengthened for example with the aid of insulating oil (GB 689 560), with the aid of a field control device which is integrated in the bushing, and by using an elastomer which bounds the joint.

SUMMARY

An exemplary high voltage bushing for connecting to an external electrical conductor to a metal-encapsulated component of a high-voltage insulation is disclosed. The bushing comprises an electrical conductor that is routed along an axis and has a plug contact and a connection for the external conductor; an insulator that is attached to the electrical conductor; a mounting flange that is attached to the insulator; and a device that surrounds the electrical conductor and controls an electrical field which acts when high voltage is applied, wherein the insulator has a tapering section that dielectrically strengthens a joint after insertion of the bushing into a plug part that closes a component of the high-voltage installation forming a seal for the insulating agent; wherein the joint is arranged between an insulating sleeve of the plug part and the tapering section of the insulator, wherein the field control device is in the form of a capacitor winding, and the capacitor winding has capacitor plates which are electrically isolated from one another, are kept at a distance from one another in a radial direction by insulating film, and are integrated in the insulator by embedding the capacitor winding in a cured polymer compound; and wherein the capacitor plates are passed through the mounting flange into the tapering section of the insulator.

An exemplary plug-in high-voltage bushing for connecting an external electrical conductor to a metal-encapsulated component is disclosed. The bushing comprising an electrical conductor that is routed along an axis and has a plug contact and a connection for the external conductor; an insulator that is attached to the electrical conductor; a device that surrounds the electrical conductor and controls an electrical field which acts when high voltage is applied, wherein the insulator has a tapering section that dielectrically strengthens a joint after insertion of the bushing into a plug part that closes a component of the high-voltage installation forming a seal for the insulating agent, and wherein the field control device is in the form of a capacitor winding, and the capacitor winding has capacitor plates which are electrically isolated from one another, are kept at a distance from one another in a radial direction by insulating film, and are integrated in the insulator by embedding the capacitor winding in a cured polymer compound.

BRIEF DESCRIPTION OF THE DRAWINGS

The disclosure will be explained in more detail in the following text with reference to drawings, in which.

DETAILED DESCRIPTION OF THE DRAWINGS

Figure 1:
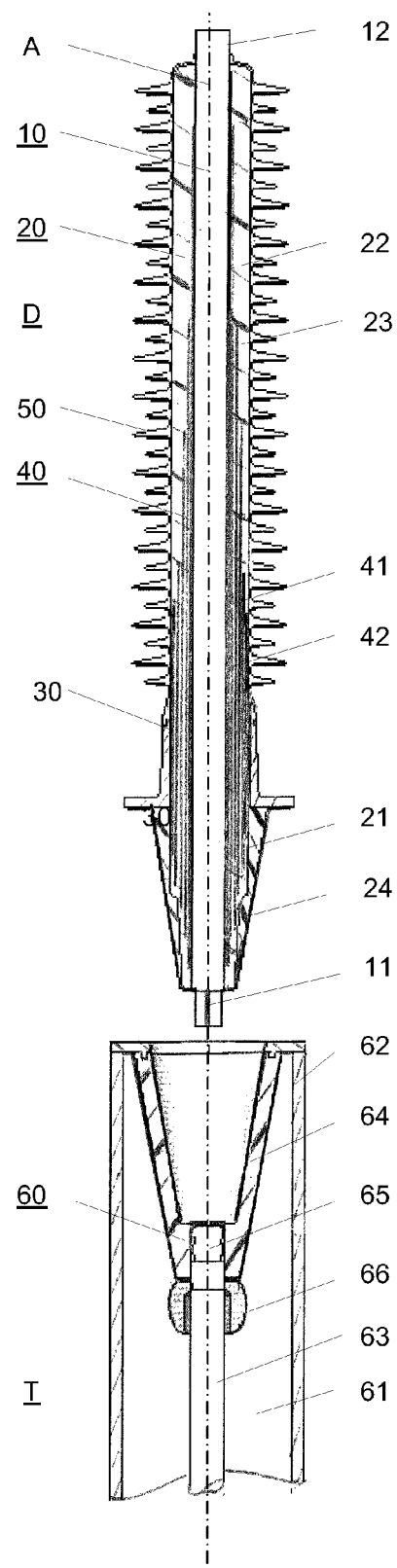
FIG. 1 shows a perspective along an axis view of a plug-in bushing during insertion into a transformer in accordance with an exemplary embodiment.

Exemplary embodiments of the present disclosure are directed to providing a plug-in bushing suitable for effectively controlling an electrical field which acts during operation of the bushing, even at very high operating voltages.

According to an exemplary embodiment of the present disclosure, a plug-in bushing is provided for connecting an external electrical conductor to a metal-encapsulated component, which is filled with a liquid or gaseous insulating agent, of a high-voltage installation which contains, in a coaxial arrangement, an electrical conductor. The electrical conductor is routed along an axis and has a plug contact and a connection for an external conductor, as well as an insulator, which is attached to the electrical conductor, a mounting flange which is attached to the insulator, and a device which surrounds the electrical conductor for controlling the electrical field which acts when high voltage is applied. The insulator has a tapering section that dielectrically strengthens a joint after insertion of the bushing into a plug part that closes the component of the high-voltage installation forming a seal for the insulating agent. The joint is arranged between an insulating sleeve of the plug part and the tapering section of the insulator. The field control device is in the form of a capacitor winding. The capacitor winding has capacitor plates that are electrically isolated from one another, are kept at a distance from one another in the radial direction by insulating film, and are integrated in the insulator by embedding the capacitor winding in a cured polymer compound. The capacitor plates are passed through the mounting flange into the tapering section of the insulator.

In another exemplary embodiment a capacitor winding, which acts as a field control device, is integrated in the insulator and is at the same time fitted with the mounting flange, the process of manufacturing the bushing is considerably simplified and the bushing is at the same time distinguished by a simple and compact design. During the manufacture of the capacitor winding, stepped capacitor plates of suitable size are easily wound into the insulating film at suitable positions. This results in reliable and furthermore very precise control of an electrical field that acts between the electrical conductor and the mounting flange, as well as a metal housing of the component, during operation of the high-voltage installation. The stepped arrangement of the plates during manufacture can be achieved for an external area, which is located on one side of the mounting flange and contains the connection for the external electrical conductor, and for an internal area, which is located on the other side of the mounting flange and is associated with the component, and therefore also for the joint. The specific field control problems that occur in each of the two areas and in the joint can therefore be solved in a manner that is simple for manufacture. Therefore, despite being of simple and compact design, the exemplary bushing of the present disclosure is suitable for effectively controlling and homogenizing the electrical field which acts on both sides of the mounting flange and in the joint during operation of the high-voltage installation, even at very high operating voltages.

A surface, which bounds the joint of the tapering insulator section can be formed by elastically deformable insulation that is held on the capacitor winding and is advantageously in the form of an elastomer. In an exemplary embodiment of the present disclosure in order to integrate the elastically deformable insulation in the insulator, the insulator can engage behind a step, which is formed in the capacitor winding.

The abovementioned boundary surface of the joint may be conical, and then tapers in a conical shape. However, it may also taper in the form of a tulip. The joint can then taper to a considerably greater extent in a section facing the plug contact than in a section facing away from the plug contact. The joint can extend parallel to a corresponding section of a boundary surface, which is formed by the insulating sleeve of the plug part, of the joint.

A shield can be fitted to an outer surface of the insulator and is passed in the axial direction from the mounting flange to a connection of the electrical conductor.

In order to avoid adversely affecting the electrical characteristics of the field-controlling capacitor winding, the cured polymer compound can contain filler that acts as a diffusion barrier for water that enters from the outside. A suitable filler can contain an inorganic powder, such as quartz powder. In another exemplary embodiment, the shield can also be arranged on a coating on the insulator, which acts as a diffusion barrier.

In order to achieve suitable stepping of the capacitor plates, and therefore a homogeneous distribution of the electrical field in the joint, those ends of the capacitor plates which face the plug contact can be located on an envelope surface that is matched to the contour of the joint.

An exemplary embodiment of the present disclosure covers a high-voltage installation having a component that is filled with a liquid or gaseous insulating agent and having the aforementioned plug-in bushing, which is inserted into a plug part which contains an insulating sleeve and closes the component of the high-voltage insulation forming a seal for the insulating agent. The plug part is in the form of a field control element.

In one embodiment of this high-voltage installation, the insulating sleeve of the plug part can be fitted with a control electrode that can carry high-voltage potential. In another exemplary embodiment, the insulating sleeve can contain field-controlling insulating material.

A surface, which bounds the joint, of the insulating sleeve can be formed by elastically deformable insulation, which can be in the form of an elastomer.

The plug-in bushing connects an internal electrical conductor, which is arranged in the component and is insulated from the metal encapsulation by a liquid or gaseous insulating agent, to an external electrical conductor, which is in general insulated by the surrounding air, but which can also be insulated by some other insulating agent, such as a solid, oil or $SF_6$, and which may be part of a high-voltage cable, a cable termination, a cable sleeve or a gas-insulated switchgear assembly.

Figure 2:
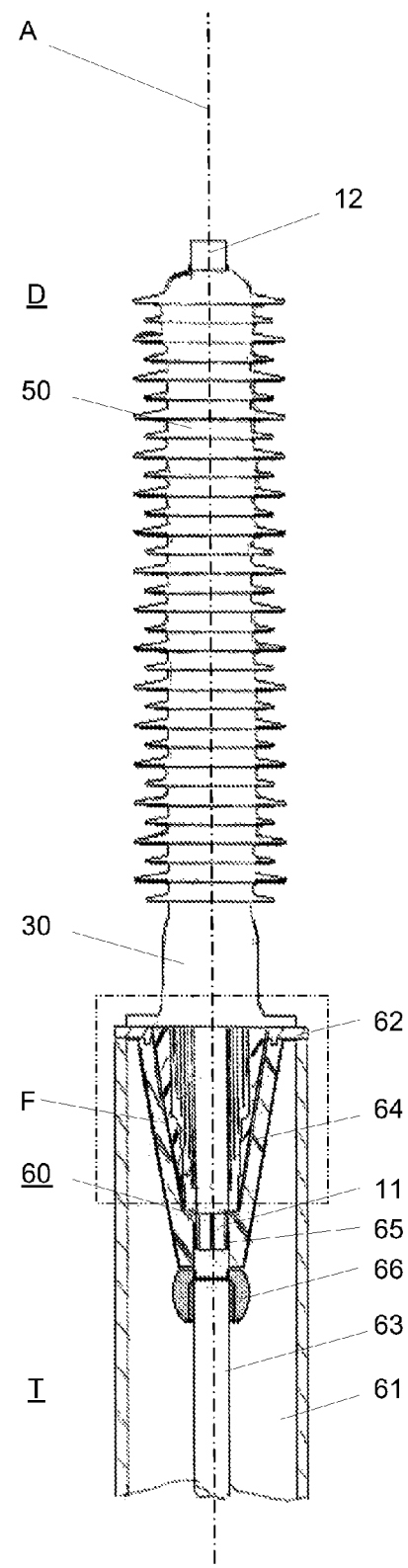
FIG. 2 shows a side view of a plug bushing along an axis after insertion into the transformer, in accordance with an exemplary embodiment.

In all the figures, the same reference symbols denote parts having the same effect. FIG. 1 shows a perspective along an axis view of a plug-in bushing during insertion into a transformer in accordance with an exemplary embodiment. FIG. 2 shows a side view of a plug bushing along an axis after insertion into the transformer, in accordance with an exemplary embodiment. As shown in FIGS. 1 and 2, a bushing D, extends along an axis A, and contains, in a coaxial arrangement, the following parts: an electrical conductor 10, which is routed along the axis A, having a lower end with a plug contact 11 in the form of a pin and an upper end having a connection 12 to an external high-voltage conductor; an insulator 20, in the form of a body of rotation having a rigid capacitor winding 40, which is mounted on the outer surface of the electrical conductor 10; elastically deformable insulation 24 which is mounted on an end surface of the capacitor winding 40; a mounting flange 30, which is mounted on the outer surface of the insulator 20; and a shield 50, which is formed by a hydrophobic polymer, such as, for example, silicone or EPDM, which is in general fitted as protection against the weather, against dirt and/or against radiation to a section of the outer surface of the insulator 20 which extends in the axial direction from the mounting flange 30 to the electrical connection 12.

The insulator 20 has a tapering lower section 21 and a section 22 which is adjacent to the lower section 21 and is substantially cylindrical. The section 22 is passed through the mounting flange 30 to the open-air connection 12 while, in contrast, the section 21 is arranged only under the mounting flange 30, between it and the plug contact 11. The capacitor winding 40 is integrated in the insulator 20 and has capacitor plates 41 that are electrically isolated from one another and are kept at a distance from one another in the radial direction by insulating film 42, which can contain paper and/or plastic. The lengths of the capacitor plates 41 both in the direction of the open-air connection 12 and in the direction of the plug contact 11 decrease continuously as the radial distance from the electrical conductor 10 increases. The electrically conductive capacitor plates 41, which are wound into the film 42 or are pressed onto the film, and in particular their ends facing the plug contact 11, are embedded in a cured polymer matrix 23.

The cured polymer resin 23 has a filled or an unfilled polymer, and can be based on an epoxy resin. The insulating material 23 can additionally comprise (e.g., contain) a filler in the form of powder, for example based on quartz. The process of manufacturing the capacitor winding 40 and the bushing can be simplified if the insulating film 42 and, if specified, the capacitor plates 41 as well have openings of suitable size. During impregnation of a capacitor winding, which has been prefabricated by winding the insulating film 42 and by introduction of the capacitor plates 41, with the uncured polymer resin then allowing the particles of the filler to easily pass through these openings.

The capacitor winding 40 can control an electrical field which is formed during operation of the bushing D, between the electrical conductor 10 which is then at high-voltage potential and the mounting flange 30 which is then kept at ground potential.

The tapering outer surface of the insulator section 21 can be formed by the elastically deformable insulation 24 which is held on one end face of the capacitor winding 40. This insulation can comprise (e.g., contains) an elastomer, for example based on EPDM or silicone. The insulation can extend from a lower face of the mounting flange 30 to the plug contact 11. The insulation is not applied to the capacitor winding 40 until the mounting flange 30 has been fixed to the capacitor winding 40, for example by clamping or by adhesive bonding. The insulation 24 is then cast onto the capacitor winding 40, together with the shield 50, in a manner which is advantageous from the manufacturing point of view.

As shown in FIG. 1, the bushing D can be passed downward along the axis A and can be inserted into a plug part 60, which is in the form of a socket, of a transformer T. The transformer T can have a metal housing 62 which is at ground potential and is filled with a liquid or gaseous insulating agent 61, in particular such as insulating oil. An electrical conductor 63, which likewise extends along the axis A and is connected to a high-voltage winding that is not illustrated, of the transformer T is held at its upper end on an insulating sleeve 64 of the plug part 60 and has a plug contact 65 in the form of a sleeve. The insulating sleeve 64, which holds the electrical conductor 63 and centers the plug contact 65 on the axis A, is attached to a part, in the form of a flange attachment, of the housing 62 forming a seal for the insulating agent, and tapers along the axis A continuously from the attachment point downward into the interior of the transformer T. The plug contact 65 and a control electrode 66, which is electrically conductively connected to the electrical conductor 63, are held at the lower end, located in the interior of the transformer, of the insulating sleeve 64. That surface of the insulating sleeve 64 which faces inward has largely the same contour as that surface of the tapering insulating section 21 which faces outward.

As shown in FIG. 2, a joint F is formed during insertion of the bushing D into the plug part 60, which is in the form of a socket, as can be seen, between the inner surface, facing the axis A, of the insulating sleeve 64 and that surface of the tapering insulator section 21 which faces outward, away from the axis A. During insertion, the plug contacts 11 and 65 can be engaged with one another, thus making an electrical connection between the two electrical conductors 10 and 63. The mounting flange 30 can be fixed to the metal housing 62 with the aid of screws, which are not illustrated. In the process, the insulation 24 is pressed against the inner surface of the insulating sleeve 64 and is elastically deformed, thus dielectrically strengthening the joint F.

During manufacture of the capacitor winding 40, the electrical field acting between the electrical conductor 10 and the mounting flange 30, as well as the metal housing 62, can be controlled very precisely by introducing capacitor plates 41, which are suitably stacked along the length, at suitable positions. This results in finely graduated homogenization of the electrical field both in an outer area, which is subject to air as the insulating agent and is located above the mounting flange 30, and in an internal area, which is located below the mounting flange 30 and is subject to the insulating agent of the transformer T, that is to say in particular an insulating oil, and therefore also in the joint F. The specific field control problems which occur in each of the two areas and in the joint are therefore solved in a simple manner from the manufacturing point of view. As illustrated, although the insulating means in the outer area is in general air, there may also be a different insulating agent there, for example oil in the case of a cable termination, or an insulating gas such as $SF_6$, for example, in a gas-insulated switchgear assembly.

Instead of a transformer T filled with insulating oil, the high-voltage installation can also contain a component, such as a switching device, for example, of a metal-encapsulated switchgear assembly which is filled with an insulating gas, such as $SF_6$, for example.

The electrical field in a high-voltage installation which contains the bushing D can be finely controlled in the area of the insulating sleeve 64 and in particular in the joint F if the plug part 60 is in the form of a field control element. This can be achieved by means of the control electrode 66, which carries high-voltage potential during operation of the installation, or else by the use of field-controlling material in the insulating sleeve 64, or by joint use of the control electrode 66 and of the field-controlling insulating material in the insulating sleeve.

Figure 3:
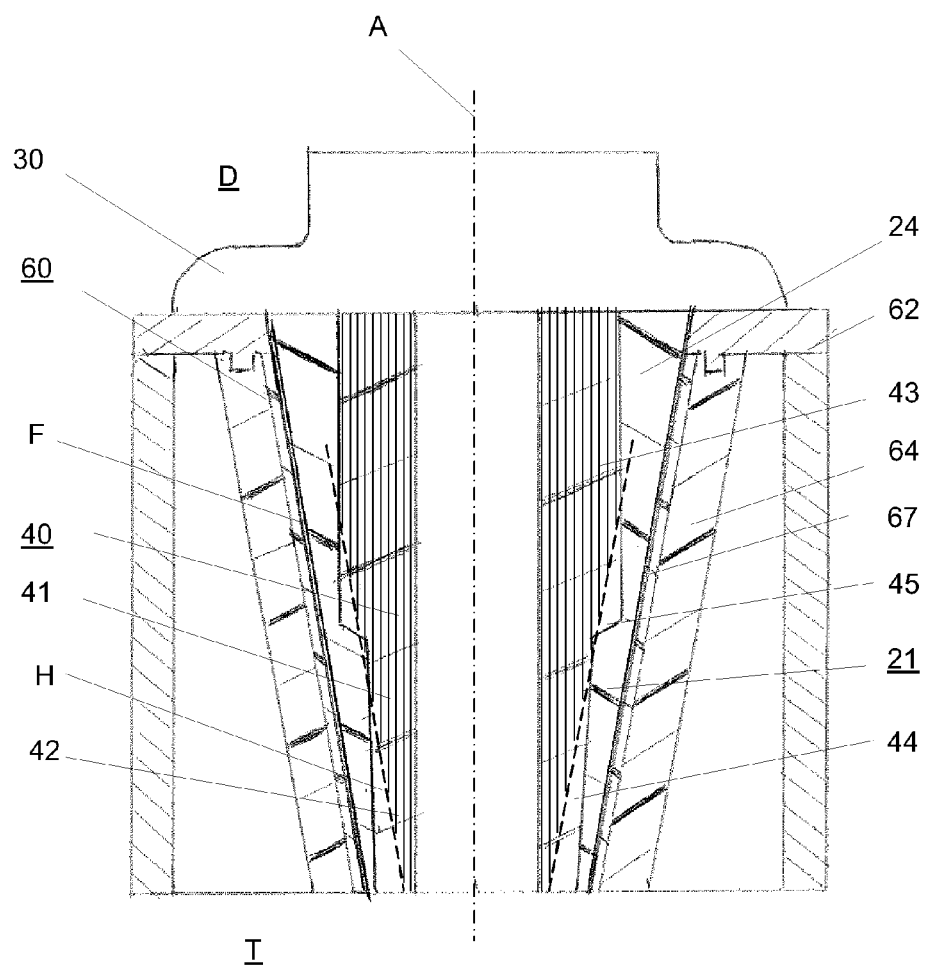
FIG. 3 shows an area in a box of a plug connection for a bushing in accordance with an exemplary embodiment.

FIG. 3 shows an area in a box of a plug connection for a bushing in accordance with an exemplary embodiment. As shown in FIG. 3, elastically deformable insulation 67 can also be integrated in the insulating sleeve 64, in addition to or instead of the elastically deformable insulation 24. If this insulation, which can be in the form of an elastomer based on silicone or EPDM, forms that surface of the insulating sleeve 64 which bounds the joint F, then the dielectric strength of the joint is additionally improved when the bushing D is inserted into the transformer T.

FIG. 3 shows that, those ends of the capacitor plates 41 which face the plug contact 11 can be located on an envelope surface H which is matched to the contour of the joint F. This can result in a uniform control of the electrical field in the joint F.

In FIG. 3, the capacitor winding 40 has two sections 43, 44 which are located in the tapering insulator section 21. The section 43 can be cylindrical and is stepped by means of a step 45, which is passed around the axis A in an annular shape and is in the form of a step, away from the section 44, which has a smaller diameter and tapers downward (e.g., in the direction of the plug contact 11). The insulation engages behind the step 45 and thus improves the adhesion of the insulation 24 on the capacitor winding 40. This is important during insertion of the bushing D into the plug part 60 since, from this time, the insulation 24 has high shear forces applied to it in the opposite direction to the insertion direction. The step absorbs a portion of the shear forces, and accordingly improves the adhesion of the insulation 24 on the capacitor winding 40.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Electrical conductor
11 Plug contact
12 External connection
20 Insulator
21, 22 Sections of the insulator 20
23 Cured polymer material 24 Insulation
30 Mounting flange
40 Capacitor winding
41 Capacitor plates
42 Insulating film
43 Cylindrical section of the capacitor winding
44 Tapering section of the capacitor winding
45 Step
50 Shield
60 Plug part
61 Insulating agent
62 Metal housing
63 Electrical conductor
64 Insulating sleeve
65 Plug contact
66 Control electrode
67 Insulation
A Axis
D Bushing
F Joint
H Envelope surface
T Transformer

What is claimed is:

1. A plug-in high-voltage bushing for connecting an external electrical conductor to a metal-encapsulated component, which is filled with a liquid or gaseous insulating agent, of a high-voltage installation, the bushing comprising:
   an electrical conductor that is routed along an axis and has a plug contact and a connection for the external conductor;
   an insulator that is attached to the electrical conductor;
   a mounting flange that is attached to the insulator;
   a shield that is cast onto an outer surface of the insulator and that extends in an axial direction from the mounting flange to the connection for the external electrical conductor; and
   a device that surrounds the electrical conductor and controls an electrical field which acts when high voltage is applied,
   wherein the insulator has a tapering section that dielectrically strengthens a joint after insertion of the bushing into a plug part that closes a component of the high-voltage installation forming a seal for the insulating agent;
   wherein the joint is arranged between an insulating sleeve of the plug part and the tapering section of the insulator,
   wherein the field control device is in the form of a capacitor winding, and the capacitor winding has capacitor plates which are electrically isolated from one another, are kept at a distance from one another in a radial direction by insulating film, and are integrated in the insulator by embedding the capacitor winding in a cured polymer compound;
   wherein the capacitor plates are passed through the mounting flange into the tapering section of the insulator, and
   wherein a surface, which bounds the joint, of the insulator includes an elastically deformable insulation which is held on the capacitor winding.

2. The bushing as claimed in claim 1, wherein a surface, which bounds the joint (F) of the insulator section, comprises elastically deformable insulation which is held on the capacitor winding.

3. The bushing as claimed in claim 2, wherein the elastically deformable insulation is an elastomer.

4. The bushing as claimed in claim 2, wherein the elastically deformable insulation engages behind a step of the capacitor winding.

5. The bushing as claimed in claim 1, wherein the cured polymer compound contains a filler which acts as a diffusion barrier for water which enters from outside.

6. The bushing as claimed in claim 1, wherein the shield is arranged on a coating of the insulator, which acts as a diffusion barrier for water.

7. The bushing as claimed in claim 1, wherein those ends of the capacitor plates which face the plug contact are located on an envelope surface (H) which is matched to contour of the joint (F).

8. A high-voltage installation having a component which is filled with a liquid or gaseous insulating agent and which comprises a plug part that closes the metal-enclosed component and forms a seal for the insulating agent, and having a plug-in bushing as claimed in claim 1, which is inserted into a plug part that contains an insulating sleeve, such that a joint is arranged between the insulating sleeve of the plug part and a tampering section of the insulator, and closes the component of the high-voltage insulation forming a seal for the insulating agent, wherein the plug part is a field control element.

9. The high-voltage installation as claimed in claim 8, wherein the insulating sleeve is fitted with a control electrode which carries a high-voltage potential.

10. The high-voltage installation as claimed in claim 8, wherein the insulating sleeve comprises field-controlling insulating material.

11. The high-voltage installation as claimed in claim 8, wherein a surface, which bounds the joint (F), of the insulating sleeve comprises elastically deformable insulation.

12. The high-voltage installation as claimed in claim 11, wherein the elastically deformable insulation is an elastomer.

13. A plug-in high-voltage bushing for connecting an external electrical conductor to a metal-encapsulated component, the bushing comprising:
   an electrical conductor that is routed along an axis and has a plug contact and a connection for the external conductor;
   an insulator that is attached to the electrical conductor;
   a shield that is cast onto an outer surface of the insulator and that extends in an axial direction from a mounting flange to the connection for the external electrical conductor; and
   a device that surrounds the electrical conductor and controls an electrical field which acts when high voltage is applied,
   wherein the insulator has a tapering section that dielectrically strengthens a joint after insertion of the bushing into a plug part that closes a component of the high-voltage installation forming a seal for the insulating agent, and
   wherein the field control device is in the form of a capacitor winding, and the capacitor winding has capacitor plates which are electrically isolated from one another, are kept at a distance from one another in a radial direction by insulating film, and are integrated in the insulator by embedding the capacitor winding in a cured polymer compound, and
   wherein a surface, which bounds the joint, of the insulator includes an elastically deformable insulation which is held on the capacitor winding.

14. The high-voltage bushing as claimed in claim 13, wherein the mounting flange is attached to the insulator.

15. The high voltage bushing as claimed in claim 13, wherein the joint is arranged between an insulating sleeve of the plug part and the tapering section of the insulator.

16. The high voltage bushing as claimed in claim 13, wherein the capacitor plates extend through the mounting flange into the tapering section of the insulator.

\* \* \* \* \*